United States Patent [19]

Knight

[11] 4,114,733

[45] Sep. 19, 1978

[54] AUTOMATIC SLACK ADJUSTERS FOR VEHICLE BRAKE LINKAGES

[75] Inventor: Peter Charles Knight, Edgbaston, England

[73] Assignee: Girling Limited, Birmingham, England

[21] Appl. No.: 814,725

[22] Filed: Jul. 11, 1977

[30] Foreign Application Priority Data

May 12, 1977 [GB] United Kingdom ............... 19932/77

[51] Int. Cl.² .............................................. F16D 65/56
[52] U.S. Cl. .......................... 188/196 BA; 188/79.5 K
[58] Field of Search ........ 188/79.5 K, 196 P, 196 BA

[56] References Cited

U.S. PATENT DOCUMENTS

| 3,662,865 | 5/1972 | Newstead et al. | 188/79.5 K X |
| 3,724,607 | 4/1973 | Reinecke | 188/79.5 K |
| 3,997,036 | 12/1976 | Zeidler | 188/79.5 K |

Primary Examiner—Duane A. Reger

Attorney, Agent, or Firm—Scrivener, Parker, Scrivener & Clarke

[57] ABSTRACT

An automatic slack adjuster for a vehicle brake linkage comprising a housing constituting a lever in the linkage, and the lever is angularly movable about the axis of a shaft to impart to the shaft a brake-applying rotary movement which it transmits to it through a meshing worm and worm wheel assembly. Automatic worm driving means are incorporated for rotating the worm for adjustment of slack in the linkage in response to relative movement between the lever and a relatively stationary part, and the worm driving means incorporates a connection having a degree of lost-motion equivalent to a desired braking clearance, and a spring-loaded clutch of the multi-plate type disposed between the worm and a slidable pawl connected to the stationary part. The clutch includes primary clutch plates and secondary clutch plates with each secondary clutch plate being provided with a tooth, and all the teeth being received in a common notch in the pawl.

2 Claims, 7 Drawing Figures

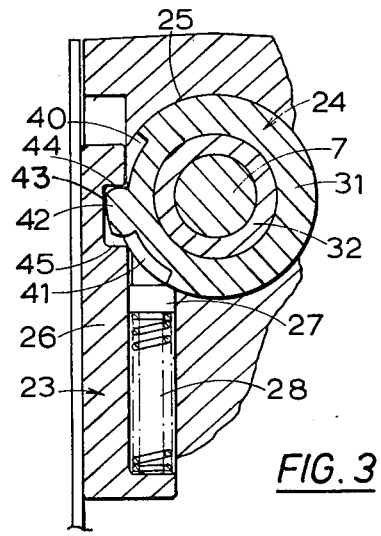
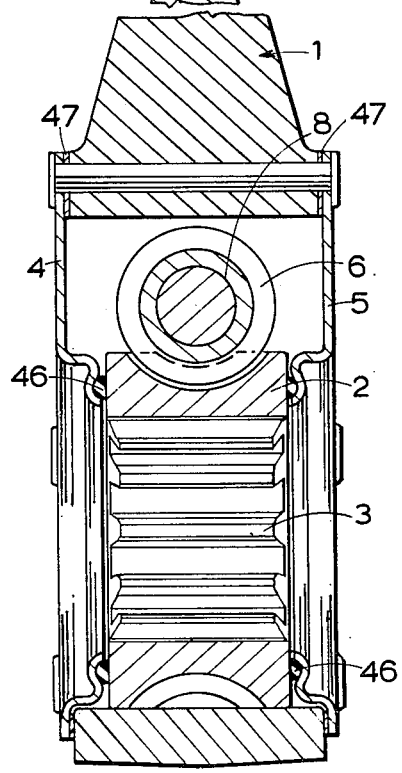
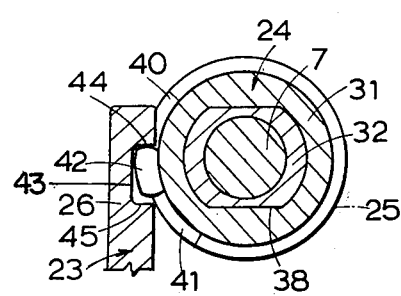
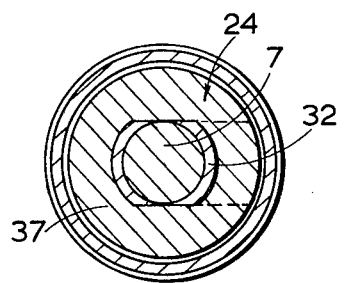
FIG. 2
FIG. 3
FIG. 4
FIG. 5

AUTOMATIC SLACK ADJUSTERS FOR VEHICLE BRAKE LINKAGES

SPECIFIC DESCRIPTION

This invention relates to an automatic slack adjuster for a vehicle brake linkage, the adjuster being of the kind comprising a housing which constitutes a lever in the linkage and is mounted for rocking movement about the axis of a shaft which is adapted to be partially rotated about an axis for applying or releasing a brake, and force is adapted to be transmitted between the housing and the shaft by means of a worm mounted in the housing and meshing with a worm wheel mounted on and secured against rotation relative to the shaft, the arrangement being such that adjustment of slack in the linkage is effected by rotation of the worm to alter the angular position of the worm wheel with respect to the housing, automatic worm driving means being incorporated for rotating the worm for adjustment of the slack in the linkage in response to relative movement between the lever and a relatively stationary part.

In some known automatic slack adjusters of the kind set forth the worm drive means includes a one-way clutch and the worm is displaced axially against an energy-storing return spring to disengage the clutch when relative movement between the lever and the stationary part has exceeded a predetermined value and, on release of the brake, the clutch is re-engaged by the release of energy in the spring which is operative to rotate the worm as the worm is returned axially to its initial position.

According to our invention in an automatic slack adjuster of the kind set forth for a vehicle brake linkage the automatic worm driving means incorporates a connection having a degree of lost-motion equivalent to a desired braking clearance and which includes a clutch comprising first clutch means coupled to the worm, second clutch means, and resilient means for urging the second clutch means normally into driving engagement with the first, and a slidable pawl acting between the second clutch means and the stationary part to effect rotation of the second clutch means after relative movement between the lever and the stationary part has exceeded a value equivalent to said degree of lost-motion, the first clutch means comprising a plurality of primary clutch plates interposed alternatively between a plurality of secondary clutch plates which define the second clutch means, each secondary clutch plate being provided with a tooth and all the teeth being received in a notch in the pawl which is of a greater length than the teeth to define the lost-motion.

This has the advantage of providing a clutch capable of transmitting a relatively high torque of which the efficiency is less likely to be reduced due to wear of the lining of the clutch plates than is a clutch of the cone type where the clutch means each comprises a single member.

Conveniently a sleeve surrounds and is coupled to a spindle fast with the worm and the clutch plates surround a portion of the sleeve which is of reduced diameter, being clamped into engagement and against a step at the change in diameter by the resilient means which act between the plates and an abutment at the outer end of the spindle remote from the worm, the primary clutch plates are keyed to the sleeve and the secondary clutch plates are freely rotatable in and located by a bore in the housing and by the pawl.

Incorporating the clutch in the sleeve provides a self-contained assembly which can simply be withdrawn for replacement and/or maintenance without affecting the spindle.

One embodiment of our invention is illustrated in the accompanying drawings in which:

FIG. 2 is a section of the line 2—2 of FIG. 1;

FIG. 3 is a section on the line 3—3 of FIG. 1;

FIG. 4 is a section on the line 4—4 of FIG. 1;

FIG. 5 is a section of the line 5—5 of FIG. 1;

Figure 1:
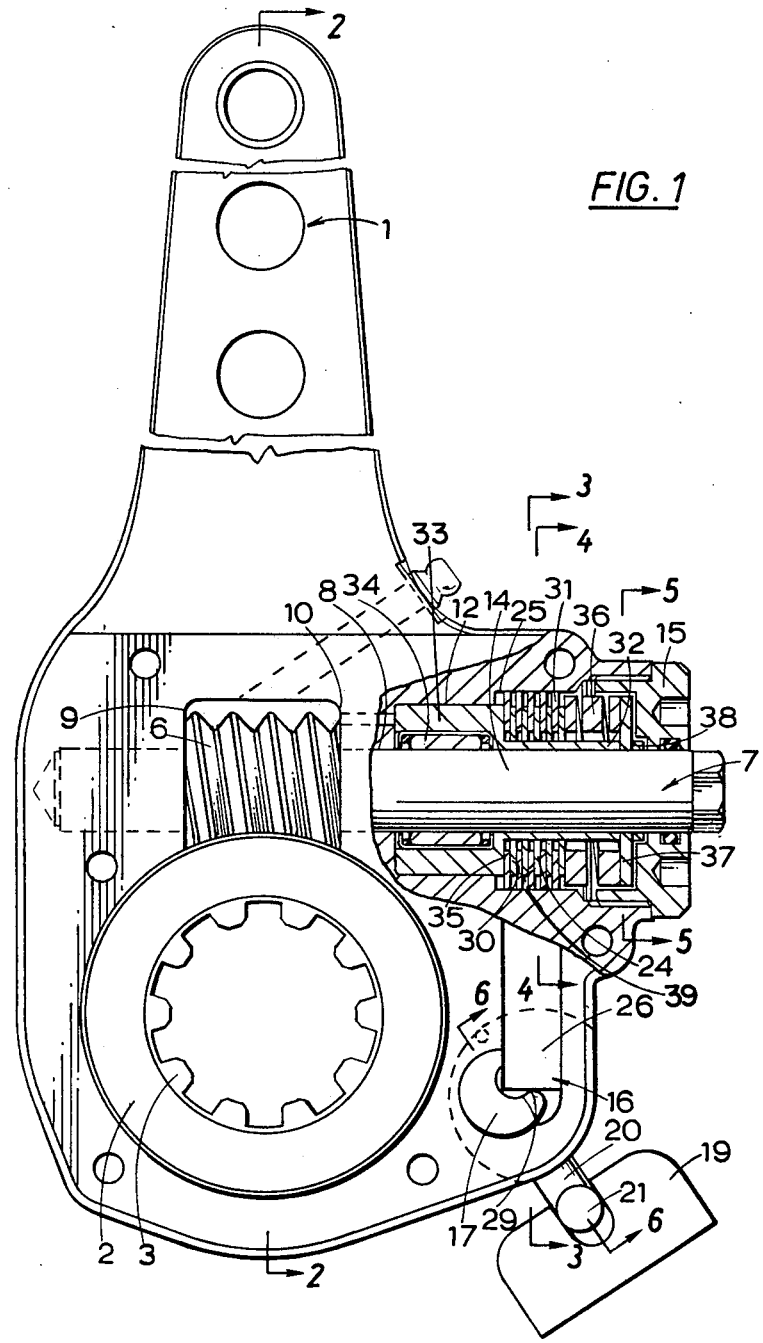
FIG. 1 is a side elevation of an automatic slack adjuster for a vehicle brake linkage with a side coverplate removed.
Figure 6:
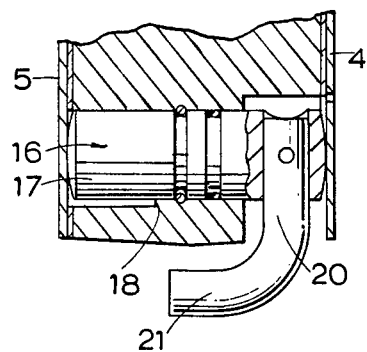
FIG. 6 is a section on the line 6—6 of FIG. 1.

The automatic slack adjuster illustrated in the accompanying drawings comprises a housing 1 constituted by a lever of a brake linkage which is adapted to be mounted for rocking movement with respect to the axis of a splined brake-applying shaft (not shown) and which has a free upper end for connection to a brake actuator through any one of three spaced eyes. The lever 1 acts on the shaft through a worm wheel 2 which is splined at 3 to the shaft and which is journalled for rotation in the housing 1 between spaced end closure plates 4 and 5 clamped against opposite sides of the housing.

The shaft is conveniently provided with at least one cam expander for applying friction members, for example shoes, to a rotatable braking member, for example a drum.

A worm 6 engaging with the worm wheel 2 is fast with a spindle 7 which is journalled for rotation in a bore 8 in the housing 1. The bore 8 is tangential to the axis of the brake-applying shaft and is enlarged at an intermediate point in its length to define spaced walls 9 and 10 between which opposite ends of the worm 6 are located in close proximity therewith.

One end of the bore 8 is counterbored at 12 into which an end portion 14 of the spindle 7 projects. The free end of that end portion 14 which projects from a closure cap 15 for the counterbore is of square or other non-circular outline to receive a key by means of which the spindle and worm can be rotated.

The housing incorporates automatic worm driving means 16 to rotate the worm 6 and the worm wheel 2 in order to compensate for wear of the linings of the friction members and thereby maintain a predetermined desired braking clearance between the friction members and the braking member. As illustrated the worm driving means comprises an adjuster shaft 17 journalled in the housing 1 for rotation in a bore 18 parallel to the axis of the worm wheel 2 but spaced radially therefrom in a direction away from the spindle 7. The adjuster shaft 17 is coupled to a member or bracket 19 which is stationary relative to the axis of the brake applying shaft by means of diametrical pin 20 and the pin 20 has an end portion 21 cranked to lie parallel to the axis of the spindle 7 and received in a notch in the bracket 19. As the lever 1 is moved angularly about the axis of the brake-applying shaft, the adjuster shaft 17 also rotates as it is moved with the lever 1. The adjuster shaft 17 is connected to the spindle 7 through a pawl 23 and a clutch assembly 24 located in the counterbore 12 and in a second counterbore 25 at that end of the housing 1.

The pawl 23 comprises a parallel sided elongate strip 26 which is guided for movement in a straight line between the sides of a parallel sided slot 27 which is tangential to the brake-applying shaft and normal to the spindle 7. The pawl 23 is cut back along one edge to define an abutment for one end of a compression return spring 28 which urges the pawl at all times into engagement with a cam formation 29 on the adjuster shaft 17.

The clutch assembly 24 is of the multi-plate type comprising alternately arranged inner and outer relatively rotatable primary and secondary clutch plates 30 and 31 which surround a reduced diameter portion 32 of a sleeve 33, in turn surrounding the spindle 14. The sleeve 33 is coupled to the spindle 14 through a one-way drive 34 and the plates 30 and 31 are clamped together and against a shoulder 35 at a step in the change in diameter by means of a compression spring 36. The spring 36 abuts against an abutment washer 37 of U shaped outline of which the limbs are received in diametrically opposed slots 38 in the sleeve 14.

The inner primary plates 30 are keyed to the sleeve 33, and the outer secondary plates 31 are freely rotatable within, and located by, the second counterbore 39 of which the outer end is closed by the closure cap 15. Each outer plate 31 is provided with a pair of angularly spaced axial slots 40 and 41 between which a tooth 42 is defined, and all the teeth 42 are received in a notch 43 at the inner end of the pawl 26. In a normal inoperative position the teeth 42 are in engagement with a face 44 at the outer end of the notch 43 and the teeth 42 are spaced from a face 45 at the inner end of the notch 43 by a distance corresponding to a predetermined clearance between the friction members and the braking member.

The clutch assembly 24 serves two purposes. The first is to protect the one-way drive 34 by limiting the torque that the drive is required to transmit. This limiting torque is determined by the force exerted by the spring 36. The second purpose is to stop adjustment taking place after the braking clearances have been taken up. The torque that can be transmitted by the clutch assembly 24 is limited as described above, hence the one-way drive 34 can only rotate the spindle 7 against a limiting reaction torque. Beyond such torque the clutch assembly will slip, with the outer plates 31 rotating relative to inner plates 30 which remain rotationally stationary relative to the housing 1. The aforementioned limited reaction torque is derived from the reaction torque in the brake applying shaft and the worm wheel 2 and through the engagement forces between the worm wheel 2 and the worm 6.

In operation, angular movement of the housing 1 in a clockwise brake-applying direction with reference to FIG. 1, rotates the brake-applying shaft through the worm 6 and the worm wheel 2, characteristically a one-way drive, until the braking clearances have been taken up. During this movement the adjuster shaft 17 is also rotated to cause the pawl 26 to slide linearly in the slot 27 against the force in the spring 28 with the face 44 moving away from the teeth 42 and the face 45 moving towards them to reduce the lost-motion clearance therebetween. Normally the face 45 will not contact the teeth 42 unless adjustment is required to compensate for wear of the friction members.

When the angular movement of the lever 1 is transmitted through the worm 6 and worm-wheel 2 to the brake applying shaft to apply the brake and further rotate the adjuster shaft 17, the face 45 of the pawl 23 rotates the outer clutch plates 31 through the teeth 42. Once the aforementioned braking clearances have been taken up the engagement forces between the worm 6 and the worm wheel 2 are of such a magnitude that the aforementioned limiting clutch torque is insufficient to rotate the worm 6. The clutch assembly 24 then slips as described above and no adjustment takes place.

When wear of the friction members has occurred, during the initial angular movement to take up the braking clearances once the lost-motion has been taken up, the outer clutch plates 31 are rotated by the pawl 26 and the inner clutch plates 30 rotate with them due to the engagement of adjacent faces of the plates. The inner clutch plates 30 rotate the spindle 7 and hence the worm 6 through the one-way drive 34. The worm rotates the worm wheel 2 relative to the housing 1 and adjustment is achieved. When all the braking clearances have been taken up the clutch assembly 24 slips as described above without impeding movement of the pawl 23 or the adjuster shaft 17.

When the brake is released the stored energy in the spring 28 maintains the pawl 26 in engagement with the adjuster shaft 17 so that the outer clutch plates 31 are returned to their initial positions by the face 44 engaging with the tooth 42. Due to the provision of the one-way drive 34 the inner clutch plates 30 also rotate with the outer clutch plates 31, but with respect to the spindle 7.

Annular sealing rings 46 are located between the cover plates 4 and 5 and the worm wheel 2, an gaskets 47 are located between the housing 1 and the plates 4 and 5. Thus the unit is sealed completely against the ingress of dirt and other foreign matter.

Figure 7:
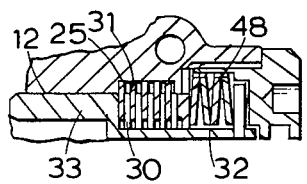
FIG. 7 is a modified spring loading for the clutch.

In the modification of FIG. 7 the compression spring 36 is replaced by a series of Belleville or like spring washers 48.

I claim:

1. An automatic slack adjuster for a vehicle brake applying linkage of the type comprising a shaft mounted for rotation about its longitudinal axis for applying or releasing the brake, and a housing which constitutes a lever in the linkage and is mounted for rocking movement about said axis of said shaft and with respect to a relatively stationary part, wherein said adjuster comprises a worm wheel mounted on and secured against rotation relative to said shaft, a worm mounted in said housing and meshing with said worm wheel to transmit angular movement of said lever to said shaft, and automatic worm driving means for rotating said worm with respect to said housing to compensate for slack in said linkage in response to relative movement between said lever and said relatively stationary part, said automatic worm driving means incorporating a connection having a degree of lost-motion equivalent to a desired braking clearance, said connection including a clutch of the multi-plate type comprising a plurality of primary clutch plates coupled to said worm a plurality of secondary clutch plates interposed alternately between said primary clutch plates and resilient means for urging said second clutch plates normally into driving engagement with said first clutch plates, and a linearly slidable pawl acting between said second clutch plates and said stationary part to effect rotation of said secondary clutch plates after relative movement between said lever and said stationary part has exceeded a value equivalent to said degree of lost-motion, each secondary plate being provided with a tooth, and said pawl being provided with a notch in which all said teeth are received, said notch being of greater length than the circumferential length of said tooth to define said lost-motion.

2. An automatic slack adjuster as claimed in claim 1, wherein a sleeve surrounds and is fast with a spindle keyed to said worm, said housing has a bore, said sleeve has a portion of reduced diameter, a shoulder is defined at a step at the change in diameter, and an abutment is located at the outer end of said spindle remote from said worm, said clutch plates surrounding said portion of said sleeve which is of reduced diameter and being clamped into engagement against said shoulder by said resilient means which act between said plates and said abutment, said primary clutch plates being keyed to said sleeve, and said secondary clutch plates being freely rotatable in, and located by said bore in said housing and by said pawl.

* * * * *